(12) United States Patent
Shalyaev et al.

(10) Patent No.: US 6,706,908 B2
(45) Date of Patent: Mar. 16, 2004

(54) METHOD AND CATALYST COMPOSITION FOR PRODUCING AROMATIC CARBONATES

(75) Inventors: Kirill Vladimirovich Shalyaev, Clifton Park, NY (US); Grigorii Lev Soloveichik, Latham, NY (US); Donald Wayne Whisenhunt, Jr., Niskayuna, NY (US); Bruce Fletcher Johnson, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 10 days.

(21) Appl. No.: 10/135,724

(22) Filed: Apr. 30, 2002

(65) Prior Publication Data

US 2002/0177521 A1 Nov. 28, 2002

Related U.S. Application Data

(62) Division of application No. 09/822,138, filed on Mar. 30, 2001, now Pat. No. 6,440,892.

(51) Int. Cl.[7] ............................. C07C 69/96; B01J 31/28
(52) U.S. Cl. ..................... 558/274; 502/150; 502/170
(58) Field of Search ..................... 558/274; 502/170, 502/201, 150

(56) References Cited

U.S. PATENT DOCUMENTS

| | | |
|---|---|---|
| 4,187,242 A | 2/1980 | Chalk |
| 5,231,210 A | 7/1993 | Joyce et al. |
| 5,239,106 A | 8/1993 | Shafer |
| 5,284,964 A | 2/1994 | Pressman et al. |
| 5,373,083 A | 12/1994 | King, Jr. et al. |
| 5,380,907 A | 1/1995 | Mizukami et al. |
| 5,399,734 A | 3/1995 | King, Jr. et al. |
| 5,498,789 A | 3/1996 | Takagi et al. |
| 5,502,232 A | 3/1996 | Buysch et al. |
| 5,543,547 A | 8/1996 | Iwane et al. |
| 5,726,340 A | 3/1998 | Takagi et al. |
| 5,760,272 A | 6/1998 | Pressman et al. |
| 5,821,377 A | 10/1998 | Buysch et al. |
| 5,856,554 A | 1/1999 | Buysch et al. |
| 6,197,991 B1 | 3/2001 | Spivack et al. |
| 6,512,134 B2 * | 1/2003 | Shalyaev et al. ........... 558/274 |

FOREIGN PATENT DOCUMENTS

| | | |
|---|---|---|
| DE | 736325 | 3/1996 |
| JP | 10158221 | 6/1980 |
| JP | 94-271506 | 9/1994 |
| JP | 94-271509 | 9/1994 |
| JP | 95-145107 | 6/1995 |
| JP | 96-89810 | 4/1996 |
| JP | 96-92168 | 4/1996 |
| JP | 96-193056 | 7/1996 |
| JP | 97-110804 | 4/1997 |
| JP | 97-255629 | 9/1997 |
| JP | 97-278715 | 10/1997 |
| JP | 97-278716 | 10/1997 |

* cited by examiner

*Primary Examiner*—Alan L. Rotman
*Assistant Examiner*—Ebenezer Sackey
(74) *Attorney, Agent, or Firm*—Andrew J. Caruso; Patrick K. Patnode

(57) ABSTRACT

The present invention provides a method and catalyst composition for carbonylating aromatic hydroxy compounds, comprising the step of contacting at least one aromatic hydroxy compound with oxygen and carbon monoxide in the presence of a carbonylation catalyst composition comprising an effective amount of at least one Group 8, 9, or 10 metal source, an effective amount of a combination of inorganic co-catalysts comprising at least one Group 4 metal source and at least one Group 11 metal source, an effective amount of at least one salt co-catalyst with an anion selected from the group consisting of carboxylate, benzoate, acetate, sulfate, and nitrate, wherein the carbonylation catalyst composition is free of a halide source.

24 Claims, No Drawings

METHOD AND CATALYST COMPOSITION FOR PRODUCING AROMATIC CARBONATES

This application is a division of Ser. No. 09/822,138 filed Mar. 30, 2001 now Pat. No. 6,440,892.

BACKGROUND OF THE INVENTION

The present invention is directed to a catalyst composition and method for producing aromatic carbonates through the carbonylation of aromatic hydroxy compounds.

Aromatic carbonates find utility, inter alia, as intermediates in the preparation of polycarbonates. For example, a popular method of polycarbonate preparation is the melt transesterification of aromatic carbonates with bisphenols. Various methods for preparing aromatic carbonates have been previously described in the literature and utilized by industry. A method that has enjoyed substantial popularity in the literature involves the direct carbonylation of aromatic hydroxy compounds with carbon monoxide and oxygen catalyzed by at least one Group 8, 9 or 10 metal source. Further refinements to the carbonylation catalyst composition include the identification of co-catalysts.

The utility of the carbonylation process is strongly dependent on the number of moles of desired aromatic carbonate produced per mole of Group 8, 9, or 10 metal utilized (i.e. "catalyst turnover number or 'TON'"). Consequently, much work has been directed to the identification of efficacious catalyst compositions that increase the catalyst turnover number.

Carbonylation catalyst literature lauds the effectiveness of halide salts, particularly bromide salts, in catalyst compositions for improving catalyst TON's. While it is true that catalyst compositions that contain halide salts have historically exhibited high activity, there are drawbacks to using halide in a carbonylation reaction. For example, when used to carbonylate phenol, bromide anions are consumed in the process, forming undesirable brominated byproducts, such as 2- and 4-bromophenols and bromodiphenylcarbonate.

It would be desirable to identify catalyst compositions that would minimize consumption of components or perhaps that would omit components such as halide. It would also be desirable to increase selectivity toward the desired carbonate product and minimizing formation of undesirable halogenated byproducts.

As the demand for high performance plastics has continued to grow, new and improved methods of providing product are needed to supply the market. Consequently, a long felt, yet unsatisfied need exists for new and improved methods and catalyst compositions for producing aromatic carbonates and the like.

SUMMARY OF THE INVENTION

Accordingly, the present invention is directed to a method and catalyst composition for producing aromatic carbonates. In one embodiment, the present invention provides a method for carbonylating aromatic hydroxy compounds, comprising the step of contacting at least one aromatic hydroxy compound with oxygen and carbon monoxide in the presence of a carbonylation catalyst composition comprising an effective amount of at least one Group 8, 9, or 10 metal source, an effective amount of a combination of inorganic co-catalysts (IOCC) comprising at least one Group 4 metal source and at least one Group 11 metal source, an effective amount of at least one salt co-catalyst with an anion selected from the group consisting of carboxylate, benzoate, acetate, sulfate, and nitrate, wherein the carbonylation catalyst composition is free of a halide source.

DETAILED DESCRIPTION OF PREFERRED EMBODIMENTS

The present invention is directed to a carbonylation method and catalyst composition for producing aromatic carbonates. The constituents of the carbonylation catalyst composition are defined as "components" irrespective of whether a reaction between said constituents occurs before or during the carbonylation reaction. Thus, the catalyst composition includes the components and any reaction products thereof. In one embodiment, the method includes the step of contacting at least one aromatic hydroxy compound with oxygen and carbon monoxide in the presence of a carbonylation catalyst composition that comprises an effective amount of at least one Group 8, 9, or 10 metal source, a combination of inorganic co-catalysts (IOCC) comprising effective amounts of at least one Group 4 metal source and at least one Group 11 metal source, and an effective amount of at least one salt co-catalyst with an anion selected from the group consisting of carboxylate, benzoate, acetate, sulfate, and nitrate, wherein the carbonylation catalyst composition is free of a halide source. Unless otherwise noted, the term "effective amount," as used herein, includes that amount of a substance capable of yielding the desired aromatic carbonate, or includes that amount of a substance that increases the selectivity of any one of the starting reagents (e.g. oxygen, carbon monoxide, and aromatic hydroxy compound) towards the desired aromatic carbonate.

In another embodiment, the method includes the step of contacting at least one aromatic hydroxy compound with oxygen and carbon monoxide in the presence of a carbonylation catalyst composition that comprises an effective amount of at least one Group 8, 9, or 10 metal source, a combination of inorganic co-catalysts (IOCC) comprising effective amounts of at least one Group 4 metal source and at least one Group 11 metal source, an effective amount of at least one salt co-catalyst with an anion selected from the group consisting of carboxylate, benzoate, acetate, sulfate, and nitrate, and an effective amount of base, wherein the carbonylation catalyst composition is free of a halide source.

In yet another embodiment, the method includes the step of contacting at least one aromatic hydroxy compound with oxygen and carbon monoxide in the presence of a carbonylation catalyst composition that comprises an effective amount of at least one Group 8, 9, or 10 metal source, a combination of inorganic co-catalysts (IOCC) comprising effective amounts of at least one Group 4 metal source and at least one Group 11 metal source, an effective amount of at least one salt co-catalyst with an anion selected from the group consisting of carboxylate, benzoate, acetate, sulfate, and nitrate, and an effective amount of an activating organic solvent, wherein the carbonylation catalyst composition is free of a halide source.

In yet another embodiment the method includes the step of contacting at least one aromatic hydroxy compound with oxygen and carbon monoxide in the presence of a carbonylation catalyst composition that comprises an effective amount of at least one Group 8, 9, or 10 metal source, a combination of inorganic co-catalysts (IOCC) comprising effective amounts of at least one Group 4 metal source and at least one Group 11 metal source, an effective amount of at least one salt co-catalyst with an anion selected from the group consisting of carboxylate, benzoate, acetate, sulfate, and nitrate, an effective amount of an activating organic solvent, and an effective amount of at least one base, wherein the carbonylation catalyst composition is free of a halide source.

Any aromatic hydroxy compound, which is convertible to a carbonate ester, is suitable in the present invention. For example, suitable aromatic hydroxy compounds include, but are not limited to, monocyclic, polycyclic or fused polycyclic aromatic monohydroxy or polyhydroxy compounds having from about 6 to about 30, and preferably from about 6 to about 15 carbon atoms. Illustrative examples include, but are not limited to, phenol, alkylphenols, alkoxyphenols, bisphenols, biphenols, and salicylic acid derivates such as methyl salicylate.

The carbonylation catalyst composition contains at least one catalyst component selected from Group 8, 9 or 10 metal sources. Typical Group 8, 9 or 10 metal sources include ruthenium sources, rhodium sources, palladium sources, osmium sources, iridium sources, platinum sources, and mixtures thereof. The quantity of the Group 8, 9, or 10 metal source is not limited in the process of the present invention. The amount employed should be about 1 gram of Group 8, 9, or 10 metal per 100 grams to 1,000,000 grams of aromatic hydroxy compound (i.e. about 1 part per million (ppm) to about 10,000 ppm of Group 8, 9, or 10 metal). For example, about 1 ppm to about 1000 ppm of Group 8, 9, or 10 metal is suitable. In one embodiment of the present invention about 1 ppm to about 30 ppm of Group 8, 9, or 10 metal is used. A typical Group 8, 9, or 10 metal source is a palladium source. The palladium source used is typically in the Pd (II) oxidation state at the beginning of the reaction. Alternatively, a palladium compound in either the Pd(0) or Pd(IV) oxidation states can be used. As used herein, the term "compound" includes inorganic, coordination and organometallic complex compounds. The compounds are typically neutral, cationic, or anionic, depending on the charges carried by the central atom and the coordinated ligands. Other common names for these compounds include complex ions (if electrically charged), Werner complexes, and coordination complexes. A Group 8, 9, or 10 metal source can be employed in a homogeneous form that is substantially soluble in the reaction media or in a heterogeneous form which is substantially insoluble in the reaction media, including, supported or polymer bound species. Examples of suitable palladium sources include, but are not limited to, palladium sponge, palladium black, palladium deposited on carbon, palladium deposited on alumina, palladium deposited on silica, palladium sulfates, palladium nitrates, palladium carboxylates, palladium oxides, palladium acetates, palladium salts of β-diketones, palladium salts of β-ketoesters, and palladium compounds containing any of the following ligands: carbon monoxide, amine, nitrite, nitrite, isonitrile, phosphine, phosphite, phosphate, alkoxide, alkyl, aryl, silyl or olefin. In one embodiment palladium(II) acetate is used. In another embodiment palladium(II) 2,4-pentanedionate is used.

The carbonylation catalyst composition in the present invention further comprises a combination of inorganic co-catalysts comprising effective amounts of at least one Group 4 metal source, and at least one Group 11 metal source. As used herein, the term "inorganic co-catalyst" (IOCC) includes any catalyst component that contains a metal element, which is present in the catalyst composition in addition to the Group 8, 9 or 10 metal source. The Group 4 metal source is at least one selected from the group consisting of zirconium, hafnium, and titanium. The Group 11 metal source is at least one selected from the group consisting of silver, gold and copper. Suitable forms of Group 4 and Group 11 IOCC's include, but are not limited to, elemental metals, salts, metal compounds in stable oxidation states, and precursors thereof which form catalytically active metal species under the reaction conditions. The compounds are typically neutral, cationic, or anionic, depending on the charges carried by the central atom and the coordinated ligands. Illustrative examples of Group 4 and Group 11 IOCC's include, but are not limited to, oxides, carboxylates, acetates, salts of β-diketones, salts of β-ketoesters, nitrates, and compounds containing any of the following ligands: carbon monoxide, amine, nitrite, nitrite, isonitrile, cyanide, phosphine, phosphite, phosphate, alkoxide, alkyl, aryl, silyl or olefin. The IOCC's are typically initially soluble in the reaction mixture, and typically remain soluble or become at least partially insoluble during the course of the reaction, or they are typically initially insoluble in the reaction mixture, and remain either insoluble or become at least partially soluble during the course of the reaction. Alternatively, the IOCC's are typically supported or polymer-bound with a variety of support media, including but not limited to carbon, alumina, silica, and zeolites.

In one embodiment the Group 4 metal is titanium. Illustrative examples of titanium sources include, but are not limited to, titanyl oxides, titanium alkoxides, titanium aryloxides, titanium nitrates, titanium carboxylates, and titanium sulfates. Additional examples of titanium sources include titanium compounds containing any one of the following ligands: carbon monoxide, amine, nitrite, nitrate nitrite, isonitrile, cyanide, phosphine, phosphite, phosphate, alkoxide, alkyl, aryl, silyl, olefin, β-diketone, or β-ketoester. In one embodiment the titanium sources is titanium(IV) oxide 2,4-pentanedionate. Mixtures of titanium compounds are also suitable.

In one embodiment the Group 11 metal is copper. Examples of copper sources include, but are not limited to, copper oxides, copper alkoxides, copper aryloxides, copper nitrate, copper carboxylates, copper sulfate, and copper compounds containing any one of the following ligands: carbon monoxide, amine, nitrite, nitrile, isonitrile, cyanide, phosphine, phosphite, phosphate, alkoxide, alkyl, aryl, silyl, olefin, β-diketone, or β-ketoester. In one embodiment the copper compound is copper(II) 2,4-pentanedionate. Mixtures of copper compounds are also suitable.

In addition to the inorganic components of the carbonylation catalyst composition in the present invention, at least one salt co-catalyst with an anion selected from the group consisting of carboxylate, benzoate, acetate, sulfate, and nitrate is also present. Examples of suitable organic co-catalyst salts include, but are not limited to, salts that contain a cation selected from the group consisting of alkali metal cations, alkaline-earth metal cations, guanidinium cations, and onium cations. For example, suitable organic salt co-catalysts include, but are not limited to, alkylammonium carboxylates (e.g. tetrabutylammonium benzoate), alkali metal acetates (e.g. sodium acetate), alkylammonium sulfates (e.g. tetrabutylammonium sulfate), and alkali metal nitrates (e.g. sodium nitrate).

The salt co-catalyst components in the carbonylation catalyst composition of the present invention can also be produced in situ. For example, the desired salt co-catalyst component can be formed by adding the appropriate acid-base combination to the reaction mixture to produce the desired salt co-catalyst in situ. Therefore, addition of alkali metal bases or alkaline-earth metal bases or amines in combination with the conjugate acids of benzoate, acetate, sulfate, or nitrate anions will produce the desired components in situ. For example, in the case where the desired salt co-catalyst component is sodium acetate, addition of sodium hydroxide and acetic acid to the reaction mixture will produce the desired sodium acetate in situ. Alternatively, in the case where the desired salt co-catalyst is an alkylammonium benzoate, such as tetrabutylammonium benzoate, addition of tributyl amine and benzoic acid to the reaction mixture will produce tributylammonium benzoate in situ, which is a functional equivalent of tetrabutylammonium benzoate.

The carbonylation catalyst composition typically includes an effective amount of at least one activating organic solvent. For example, activating organic solvents include polyethers (e.g. compounds containing two or more C—O—C linkages). The polyether used is typically free from hydroxy groups to maximize its desired activity and avoid competition with the aromatic hydroxy compound in the carbonylation reaction. Typical polyethers contain two or more (O—C—C) units. The polyether is typically an aliphatic or mixed aliphatic-aromatic. As used in the identification of the polyether, the term "aliphatic" refers to the structures of hydrocarbon groups within the molecule, not to the overall structure of the molecule. Thus, "aliphatic polyether" includes heterocyclic polyether molecules containing aliphatic groups within their molecular structure. Suitable aliphatic polyethers include diethylene glycol dialkyl ethers such as diethylene glycol dimethyl ether (hereinafter "diglyme"), triethylene glycol dialkyl ethers such as triethylene glycol dimethyl ether (hereinafter "triglyme"), tetraethylene glycol dialkyl ethers such as tetraethylene glycol dimethyl ether (hereinafter "tetraglyme"), polyethylene glycol dialkyl ethers such as polyethylene glycol dimethyl ether and crown ethers such as 15-crown-5 (1,4,7,10,13-pentaoxacyclopentadecane) and 18-crown-6 (1,4,7,10,13,16-hexaoxcyclooctadecane). Illustrative examples of mixed aliphatic-aromatic polyethers include diethylene glycol diphenyl ether and benzo-18-crown-6. Mixtures of polyethers are also suitable.

In alternative embodiments, the activating organic solvent can be a nitrile. Suitable nitrile solvents for the present method include $C_{2-8}$ aliphatic or $C_{7-10}$ aromatic mononitriles or dinitriles. Illustrative mononitriles include acetonitrile, propionitrile, and benzonitrile. Illustrative dinitriles include succinonitrile, adiponitrile, and benzodinitrile.

In further alternative embodiments, the activating organic solvent can be a carboxylic acid amide. For example, fully substituted amides (containing no NH groups including the amide nitrogen) are suitable. Typically, aliphatic, aromatic or heterocyclic amides are used. Illustrative examples of amides include dimethylformamide, dimethylacetamide (hereinafter sometimes "DMA"), dimethylbenzamide and N-methylpyrrolidinone (NMP).

In yet another alternative embodiment, the activating organic solvent is an aliphatic, aromatic or heterocyclic sulfone. Illustrative sulfones include dimethyl sulfone, diethyl sulfone, diphenyl sulfone and sulfolane (tetrahydrothiophene-1,1-dioxide).

It is noted that the function of the activating organic solvent in the present invention is not that of an inert solvent. Rather, the activating organic solvent is an active catalyst component that improves the yield of or selectivity toward the desired aromatic carbonate. Typically, about 1% to about 60% by volume based on the total volume of aromatic hydroxy compound and activating organic solvent is used. In one embodiment, about 1% to about 10% by volume based on the total volume of aromatic hydroxy compound and activating organic solvent is used. The amount of activating organic solvent typically depends to some extent on the salt co-catalyst composition and the complexing ability of the activating organic solvent employed. Crown ethers, for example, have a very high complexing tendency with alkali metal cations. For example, 15-crown-5 complexes efficiently with sodium and 18-crown-6 with potassium. Such compounds are used in amounts as low as an equimolar amount based on salt co-catalyst composition.

In one embodiment, at least one base is typically present in carbonylation catalyst composition of the present invention. Suitable bases include, but are not limited to, alkali metal, alkaline-earth metal, guanidinium, or onium salts of basic compounds, hydroxides including onium hydroxides, mono or polyalkoxides with linear or branched alkyl chains having from about 1 to about 30 carbon atoms, aryloxides including monocyclic, polycyclic or fused polycyclic aromatic monohydroxy or polyhydroxy compounds having from about 6 to about 30, and preferably from about 6 to about 15 carbon atoms. Typical onium cations contain organic residues which typically include $C_{1-20}$alkyl, $C_{6-10}$aryl, or alkyl-aryl combinations thereof. A second suitable class of bases includes tertiary amines with organic residues which contain alkyl residues having from about 1 to about 20 carbon atoms, aryl residues having from about 6 to about 30, and preferably from about 6 to about 15 carbon atoms, or alkyl-aryl combinations thereof. Typical bases include, but are not limited to, sodium hydroxide, lithium hydroxide, potassium hydroxide, tetraalkylammonium hydroxides (e.g. tetramethylammonium hydroxides, tetraethylammonium hydroxide, methyltributylammonium hydroxide and tetrabutylammonium hydroxide) sodium phenoxide, lithium phenoxide, potassium phenoxide, and tetraalkylammonium phenoxides (e.g. tetramethylammonium phenoxide, tetraethylammonium phenoxide, methyltributylammonium phenoxide and tetrabutylammonium phenoxide).

Typically, the molar ratio of the IOCC's relative to the Group 8, 9, or 10 catalyst at the initiation of the reaction is between about 0.1 mole and about 100 moles per mole of Group 8, 9, or 10 catalyst. In one embodiment between about 1 mole and about 20 moles of each IOCC per mole of Group 8, 9, or 10 catalyst is used. In another embodiment, between about 2 moles and about 15 moles of each IOCC per mole of Group 8, 9, or 10 catalyst is used. For example, when the Group 8, 9, or 10 catalyst is palladium, the molar ratio of titanium to palladium is typically between about 2 moles and about 15 moles per mole of palladium at the initiation of the reaction, and the molar ratio of copper relative to palladium is typically between about 2 moles and about 15 moles per mole of palladium at the initiation of the reaction.

The molar ratio of the salt co-catalyst relative to Group 8, 9, or 10 catalyst present in the carbonylation catalyst composition at the initiation of the reaction is between about 0.1 mole and about 10000 moles per mole of Group 8, 9, or 10 catalyst. In one embodiment the molar ratio of the salt co-catalyst relative to Group 8, 9, or 10 catalyst is between about 1 mole and about 1000 moles. For example, when the Group 8, 9 or 10 catalyst is palladium, the molar ratio of the salt co-catalyst relative to palladium at the initiation of the reaction is typically between about 1 mole and about 600 moles per mole of palladium.

The molar ratio of the base relative to the Group 8, 9, or 10 catalyst at the initiation of the reaction is typically between about 0.1 mole and about 1000 moles of base per mole of the Group 8, 9, or 10 catalyst. In one embodiment, the molar ratio of the base relative to the Group 8, 9, or 10 catalyst is between about 1 mole and about 600 moles per mole of Group 8, 9, or 10 catalyst. For example, when the Group 8, 9 or 10 catalyst is palladium the molar ratio of the base to palladium is typically between about 1 mole and about 400 moles per mole of palladium.

The carbonylation method can be carried out in a variety of reactor systems including, but not limited to, stirred vessels, autoclaves and bubble columns, each of which is capable of being operated under batch-liquid/batch-gas reactor conditions (i.e. batch/batch), batch-liquid/continuous-gas reactor conditions (i.e. batch/flow or semi-continuous), or continuous-liquid/continuous-gas reactor conditions (i.e. flow/flow). In one embodiment two or more reactors are typically employed in a cascade. In one embodiment about 2 to about 15 reactors are used. When a reactor cascade is used instead of an individual reactor, the separate gas addition preferably proceeds in such a way that the optimal gas concentrations are ensured in each of the reactors. Due in part to the low solubility of carbon monoxide and oxygen in organic aromatic hydroxy compounds, such as phenol, it is preferable that each reactor vessel be pressurized. A total pressure in the range up to about 35 megapascals (MPa) is used. In one embodiment the reaction pressure is between about 0.5 MPa and about 14 MPa.

The reaction gases are typically reagent grade purity, and special care must be taken to ensure that no catalyst composition poisons are present as impurities in the gas sources. In one embodiment the carbon monoxide and oxygen are introduced independently of each other into the reactor vessel. In an alternative embodiment the carbon monoxide and oxygen are introduced into the reactor vessel as a single premixed gas mixture comprising carbon monoxide and oxygen. The composition of the reaction gases comprising carbon monoxide and oxygen can be varied in broad concentration ranges. For example the volume percent oxygen in the gas mixtures can be up to about 0.1 volume % to about 20 volume %. In one embodiment the volume % of oxygen in the gas mixture is between about 1% and about 9%. Gas sparging or mixing can be used to aid the reaction. Additional inert gases, such as nitrogen, helium, neon, argon, krypton, xenon, or any other gas which has no negative effect on the carbonylation reaction can be added to the reactor vessel in order to dilute the carbon monoxide and oxygen gas mixture. For example, air is an acceptable substitute for pure oxygen. The concentration of inert gas in the reaction gas is typically up to about 60 volume %. In one embodiment the volume % of inert gas is about 0% to about 20% of the total gas volume.

Typical reaction temperatures are between about 50° C. and about 150° C. In one embodiment the reaction temperature is between about 90° C. and about 110° C. Provisions are typically made for including a drying agent or a drying process step in the overall reaction method. Higher catalyst turnover numbers are typically obtained if water is removed from the reaction mixture during the reaction.

The following examples are included to provide additional guidance to those skilled in the art in practicing the claimed invention. The examples provided are merely representative of the work that contributes to the teaching of the present application. Accordingly, the following examples are not intended to limit the invention, as defined in the appended claims, in any manner.

In the following examples, the aromatic carbonate produced is diphenyl carbonate (DPC) and the Group 8, 9, or 10 metal utilized is palladium. For convenience, the number of moles of DPC produced per mole of palladium charged to a reaction is referred to as the palladium turnover number (Pd TON), and is used as an activity metric in the following examples.

EXAMPLES 1–5

Carbonylation reaction were carried out in a glass reaction vessel containing 0.25 ppm concentration of palladium(II) 2,4-pentanedionate in phenol, IOCC combinations in equivalents versus palladium, various salt co-catalyst components in equivalents versus palladium, and sodium hydroxide in equivalents versus palladium. Titanium was supplied as titanium(IV) oxide 2,4-pentanedionate and copper as copper(II) 2,4-pentanedionate. The components were heated to 100° C. for 3 hours in an atmosphere of approximately 6-7 mole % oxygen in carbon monoxide at about 11 megapascals. Amounts are in parts per million (ppm) or equivalents (eq); TBA-Benz is tetrabutylammonium benzoate; NaOAc is sodium acetate; [TBA]$_2$-SO$_4$ is tetrabutylammonium sulfate. Average results of multiple runs are given in Table 1.

TABLE 1

| Example | Pd ppm | Cu eq. vs. Pd | Ti eq. vs. Pd | Salt/ eq. vs. Pd | NaOH eq. vs. Pd | Pd TON |
| --- | --- | --- | --- | --- | --- | --- |
| 1 | 25 | 12 | 6 | TBA-Benz/400 | 200 | 1270 |
| 2 | 25 | 12 | 12 | TBA-Benz/400 | 400 | 641 |
| 3 | 25 | 12 | 12 | NaOAc/400 | 400 | 98 |
| 4 | 25 | 12 | 6 | NaOAc/400 | 200 | 340 |
| 5 | 25 | 12 | 12 | [TBA]$_2$-SO$_4$/400 | 400 | 1640 |

EXAMPLES 6–7

Carbonylation reaction mixtures comprised phenol solutions (about 46 g) containing about 15 parts per million (ppm) palladium added as palladium(II) 2,4-pentanedionate (about 0.0028 g), copper added as copper(II) 2,4-pentanedionate (0.024 g), titanium added as titanium(IV) oxide 2,4-pentanedionate (about 0.48 g), sodium nitrate (about 0.187 g), tetraglyme (about 4.6 g), and optionally sodium hydroxide (about 0.055 g). Reactions were carried out under batch-batch conditions in a Hastelloy-C autoclave for about 3 hours at about 100° C. in a premixed gas mixture containing about 8.7 mole % oxygen in carbon monoxide at a total pressure of about 10.3 MPa. Molecular sieves (1/16" pellets, 3 Å, 30 g) were placed in a perforated Teflon basket mounted to the stir shaft of the reactor. Amounts are in parts per million (ppm) or equivalents (eq). Reaction mixtures were analyzed by gas chromatography (GC). Results are shown in Table 2.

TABLE 2

| Example | Pd ppm | Cu eq. vs. Pd | Ti eq. vs. Pd | NaNO$_3$ eq. vs. Pd | NaOH eq. vs. Pd | Tetra- glyme wt % | Pd TON |
| --- | --- | --- | --- | --- | --- | --- | --- |
| 6 | 15 | 10.7 | 21.4 | 256 | 0 | 9 | 2554 |
| 7 | 15 | 10.7 | 21.4 | 256 | 160 | 9 | 5373 |

It will be understood that each of the elements described above, or two or more together, can also find utility in applications differing from the types described herein. While the invention has been illustrated and described as embodied in a method and catalyst composition for producing aromatic carbonates, it is not intended to be limited to the details shown, since various modifications and substitutions can be made without departing in any way from the spirit of the present invention. For example, additional effective IOCC compounds can be added to the reaction. As such, further modifications and equivalents of the invention herein disclosed can occur to persons skilled in the art using no more than routine experimentation, and all such modifications and equivalents are believed to be within the spirit and scope of the invention as defined by the following claims.

What is claimed is:

1. Method for carbonylating an aromatic hydroxy compound, comprising the step of contacting at least one aromatic hydroxy compound with oxygen and carbon monoxide in the presence of a carbonylation catalyst composition comprising the following and any reaction products thereof:

an effective amount of at least one Group 8, 9, or 10 metal source;

an effective amount of a combination of inorganic co-catalysts comprising at least one Group 4 metal source and at least one Group 11 metal source; and an effective amount of at least one salt co-catalyst with an anion selected from the group consisting of carboxylate, benzoate, acetate, sulfate, and nitrate;

wherein the carbonylation catalyst composition is free of a halide source.

2. The method of claim 1, wherein the Group 8, 9, or 10 metal source is a palladium source.

3. The method of claim 2, wherein the palladium source is palladium(II) 2,4-pentanedionate.

4. The method of claim 1, wherein the aromatic hydroxy compound is phenol.

5. The method of claim 1, wherein the Group 4 metal source comprises a titanium source and the Group 11 metal source comprises a copper source.

6. The method of claim 5, wherein the titanium source is titanium(IV) oxide 2,4-pentanedionate and the copper source is copper(II) 2,4-pentanedionate.

7. The method of claim 1, wherein the salt co-catalyst contains a cation selected from the group consisting of alkali metal cation, alkaline-earth metal cation, guanidinium cation, and onium cation.

8. The method of claim 7, wherein the salt co-catalyst is at least one member selected from the group consisting of alkylammonium carboxylates, alkali metal acetates, alkylammonium sulfates, and alkali metal nitrates.

9. The method of claim 8, wherein the salt co-catalyst is at least one member selected from the group consisting of sodium acetate, tetrabutylammonium benzoate, tetrabutylammonium sulfate, and sodium nitrate.

10. The carbonylation catalyst composition of claim 2, wherein the molar ratio of the Group 4 metal source to palladium is between about 0.1 mole to about 100 moles per mole of palladium and the molar ratio of the Group 11 metal source to palladium is between about 0.1 mole to about 100 moles.

11. The carbonylation catalyst composition of claim 2, wherein the molar ratio of the salt co-catalyst to palladium is between about 0.1 mole to about 10000 moles per mole of palladium.

12. The method of claim 1, further comprising at least one activating organic solvent.

13. The method of claim 12, wherein the activating organic solvent is one member selected from the group consisting of polyether, nitrile, carboxylic acid amide, and sulfone.

14. The method of claim 1, further comprising at least one base.

15. The method of claim 14, wherein the base is at least one member selected from the group consisting of basic oxide, hydroxide, alkoxide, aryloxide, and amine.

16. The method of claim 15, wherein the base comprises one member selected from the group consisting of alkali metal hydroxide, alkaline-earth metal hydroxide, and guanidinium hydroxide.

17. The method of claim 16, wherein the base comprises sodium hydroxide.

18. The method of claim 15, wherein the base comprises an onium hydroxide.

19. The method of claim 18, wherein the base comprises a tetraalkylammonium hydroxide.

20. The method of claim 19, wherein the base comprises tetramethylammonium hydroxide.

21. The method of claim 14, wherein the molar ratio of the base to the Group 8, 9 or 10 metal source is between about 0.1 to about 1000.

22. A method for carbonylating an aromatic hydroxy compound, comprising the step of contacting at least one aromatic hydroxy compound with oxygen and carbon monoxide in the presence of a carbonylation catalyst composition comprising the following and any reaction products thereof:

an effective amount of palladium(II) 2,4-pentanedionate;

an effective amount of a combination of titanium(IV) oxide 2,4-pentanedionate and copper(II) 2,4-pentanedionate; and an effective amount of at least one salt co-catalyst selected from the group consisting of sodium acetate, tetrabutylammonium benzoate, tetrabutylammonium sulfate, tetrabutylammonium nitrate, and sodium nitrate;

wherein the carbonylation catalyst composition is free of a halide source.

23. A method for carbonylating an aromatic hydroxy compound, comprising the step of contacting at least one aromatic hydroxy compound with oxygen and carbon monoxide in the presence of a carbonylation catalyst composition comprising the following and any reaction products thereof:

an effective amount of palladium(II) 2,4-pentanedionate;

an effective amount of a combination of titanium(IV) oxide 2,4-pentanedionate and copper(II) 2,4-pentanedionate;

an effective amount of at least one salt co-catalyst selected from the group consisting of sodium acetate, tetrabutylammonium benzoate, tetrabutylammonium sulfate, and sodium nitrate; and an effective amount of sodium hydroxide;

wherein the carbonylation catalyst composition is free of a halide source.

24. A method for carbonylating an aromatic hydroxy compound, comprising the step of contacting at least one aromatic hydroxy compound with oxygen and carbon monoxide in the presence of a carbonylation catalyst composition comprising the following and any reaction products thereof:

an effective amount of palladium(II) 2,4-pentanedionate;

an effective amount of a combination of titanium(IV) oxide 2,4-pentanedionate and copper(II) 2,4-pentanedionate;

an effective amount of at least one salt co-catalyst selected from the group consisting of sodium acetate, tetrabutylammonium benzoate, tetrabutylammonium sulfate, and sodium nitrate;

an effective amount of sodium hydroxide; and an effective amount of tetraglyme;

wherein the carbonylation catalyst composition is free of a halide source.

* * * * *